May 17, 1960 W. E. FOLKERTS 2,937,061
SEALING DEVICE
Filed March 31, 1958 2 Sheets-Sheet 1
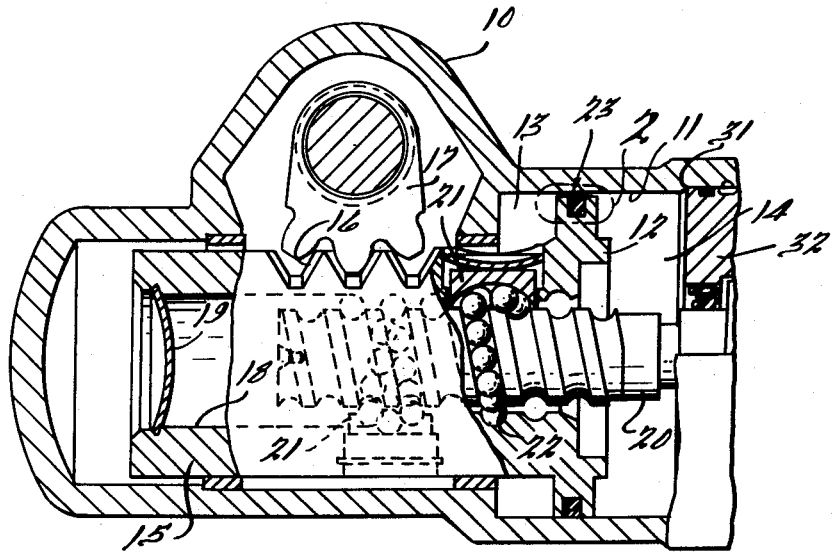
FIG. 1
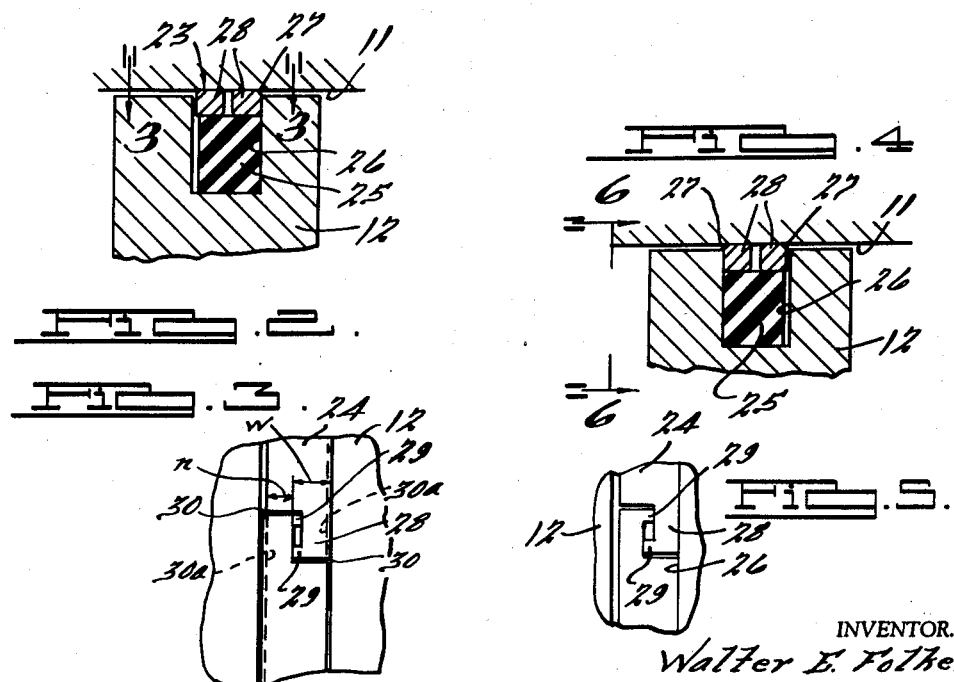
INVENTOR.
Walter E. Folkerts
BY Harness & Harris
ATTORNEYS.

May 17, 1960  W. E. FOLKERTS  2,937,061
SEALING DEVICE
Filed March 31, 1958  2 Sheets-Sheet 2
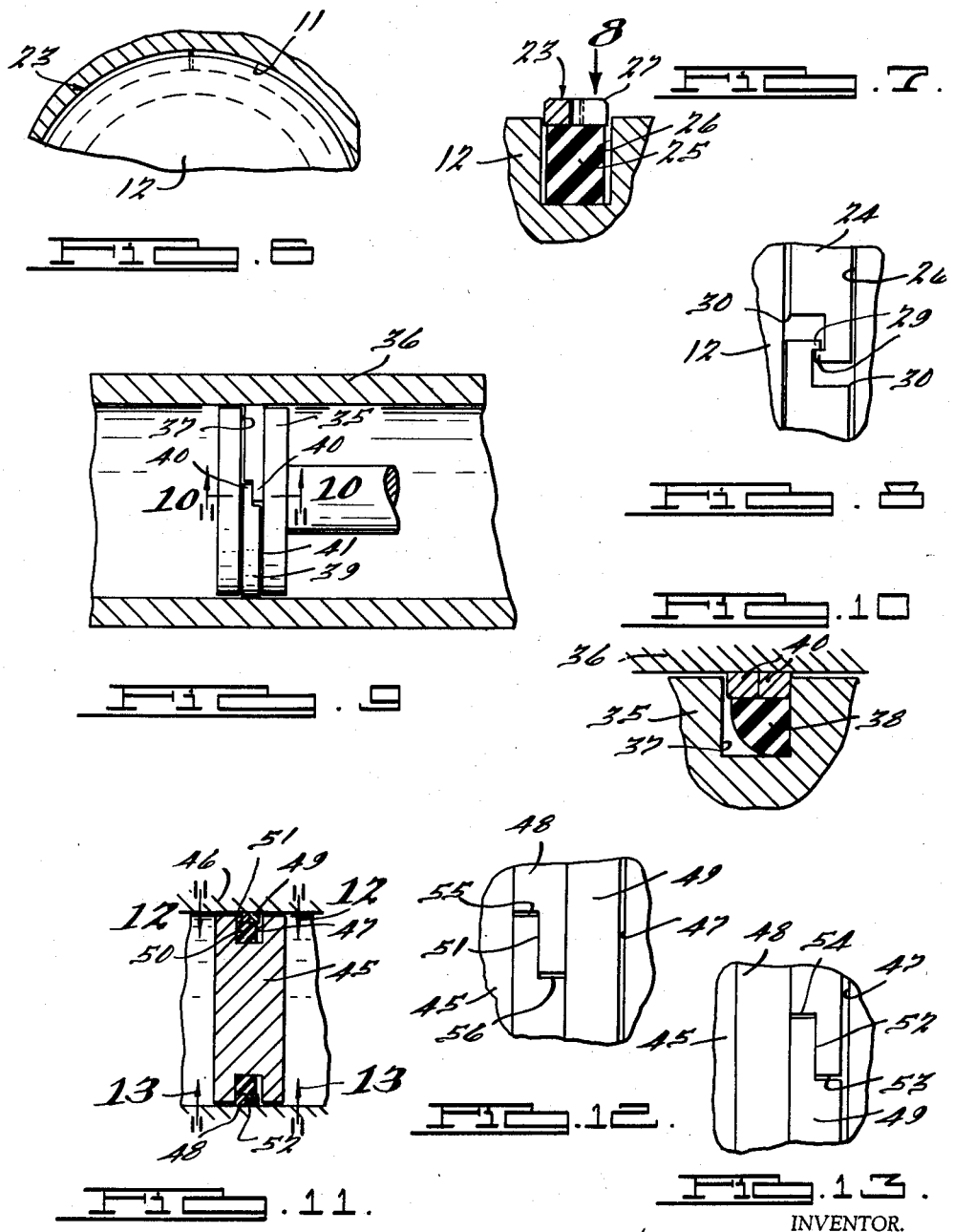
INVENTOR.
Walter E. Folkerts
BY Harness & Harris
ATTORNEYS.

United States Patent Office 2,937,061
Patented May 17, 1960

2,937,061

SEALING DEVICE

Walter E. Folkerts, Hazel Park, Mich., assignor to Chrysler Corporation, Highland Park, Mich., a corporation of Delaware Application March 31, 1958, Serial No. 725,068

13 Claims. (Cl. 309—46)

This invention relates to improvements in sealing devices and to a method for manufacturing the same and is particularly concerned with the provision of an effective seal for a piston reciprocable within a cylinder, as for example, in a hydraulically actuated automotive power steering gear. It will be apparent from the following, however, that the improved sealing device can be suitably used in many other applications.

In a conventional type of seal for a hydraulically actuated piston, as illustrated for example in Christensen Patent No. 2,509,672, a split or broken piston ring having side-by-side lapping ends is contained within a circumferential groove in the piston. A ring of rubber-like material is also disposed within the groove under compression between the piston ring and the base of the groove so as to urge the piston ring into sealing engagement with the inner wall of the cylinder and also to complete seals with both the base of the groove and the inner circumference of the piston ring. By virtue of such a structure, a sliding sealing engagement between the piston ring and cylinder wall is achieved. However unless the dimensional tolerances of the lapping ends of the piston ring are maintained within extremely close limits which are impractical from a cost standpoint with conventional mass production methods of manufacture, leakage of fluid across the piston at the region of the lapping edges occurs and is particularly odjectional in such applications as power steering where a predetermined and positively dependable high pressure differential across the piston is essential.

An important object of the present invention is to provide an imporved sealing structure of the foregoing character wherein leakage of fluid across the seal at the lapping ends of the piston ring is effectively minmized even during comparatively high pressure operation.

Another object is to provide such a device which is particularly simple in structure and subject to economical manufacture by mass production methods and which avoids the usual problems of maintaining precise production tolerances.

Another object is to provide an improved economical method of manufacturing such a seal which is especially adapted for use in high pressure applications.

Other objects of this invention will appear in the following description and appended claims, reference being had to the accompanying drawings forming a part of this specification wherein like reference characters designate corresponding parts in the several views.

Figure 1 is a fragmentary longitudinal sectional view through the piston and worm shaft of an automotive power steering gear, illustrating a seal embodying the present invention.

Figure 2 is a fragmentary enlarged view of the portion enclosed within the dotted outline 2 of Figure 1, showing details of the seal.

Figure 3 is a fragmentary elevational view taken in the direction of the arrows substantially along the line 3—3 of Figure 2.

Figure 4 is a view similar to Figure 2 but showing the relationship between the seal and piston when the latter is subject to an oppositely directed pressure differential from that of Figure 2.

Figure 5 is a view similar to Figure 3 showing a modified piston ring.

Figure 6 is a fragmentary side elevational view taken in the direction of the arrows substantially along the line 6—6 of Figure 4.

Figure 7 is a fragmentary view similar to Figures 2 and 4, but showing the assembled piston and seal prior to mounting within the cylinder.

Figure 8 is a fragmentary elevational view taken in the direction of the arrow 8 of Figure 7.

Figure 9 is a fragmentary longitudinal section through a piston and cylinder assembly illustrating another embodiment of the present invention.

Figure 10 is a fragmentary sectional view taken in the direction of the arrows substantially along the line 10—10 of Figure 9.

Figure 11 is a fragmentary longitudinal sectional view through a piston and cylinder assembly, illustrating still another embodiment of the present invention.

Figures 12 and 13 are enlarged elevational views taken in the direction of the arrows substantially along the lines 12—12 and 13—13 respectively.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring in more particularity to Figures 1–8, an application of the present invention in a power steering gear is illustrated wherein a housing 10 for fluid contains a cylindrical portion 11. A piston 12 reciprocable in the cylindrical portion 11 partitions the latter into chambers 13 and 14 which are suitably connected by valve means, not shown, with a pressure source for maintaining a pressure differential between the chambers 13 and 14, thereby to drive piston 12 to the left or right in a steering action. Integral with the piston 12 is a hollow extension 15 closed at its left end by plate 19. The upper edge of the extension 15 comprises an integral toothed gear rack 16 meshed with a sector gear 17 which in turn is operatively coupled with the dirigible wheels of the vehicle. A worm 20 suitably mounted wtihin the housing 10 is coupled with a steering wheel for manual actuation and is also in driving engagement wtih the extension 15 by means of a ball-nut type connection which may be conventional.

In the present instance the hollow interior 18 of extension 15 is provided with grooves mating with the grooves of the worm 20 to carry two sets of balls 22, each set of balls comprising a portion of a single helical turn of the mating grooves. Associated with each set or partial helix of balls 22 is a crossover port member 21 secured within the extension 15 and providing a path over the crests of the worm to enable endless recirculation of the balls 22 upon rotaton of worm 20.

In accordance with the operation of the structure described thus far, upon application of pressure to one or the other of the chambers 13, 14, piston 12 is driven in one direction or the other so as to rock sector gear 17 and thereby effect a power boost to the manual steering force.

In order to assure positive power steering action by means of piston 12, a seal 23 is provided between the piston 12 and cylinder 11. As illustrated in Figures 2, 3, and 6, the seal 23 comprises a split or broken piston ring 24 of comparatively hard material, such as steel or cast iron, for example, and an annular ring 25 of resiliently deformable rubber-like material of a type which will not react with the hydraulic fluid. The rubber-like ring 25 is confined with a groove 26 formed in the outer periphery of the piston 12. In the embodiment shown, the ring 25 is preferably of rectangular section and the radial walls of the groove 26 extend normally to the axis of the piston and in parallelism with the opposite sides of the ring 25.

In the uncompressed condition of the ring 25, Figure 7, the latter occupies approximately 95% of the volume of the groove 26 and is thereby provided with room for expansion upon being compressed when the ring 24 is fitted therearound and the assembly is mounted within the cylinder 11. In the assembled position, the rubber-like ring 25 is compressed between the base of the groove 26 and the inner circumference of the piston ring 24 to provide fluid sealing engagement with both structures and also to urge the outer periphery of the ring 24 into sliding fluid sealing engagement with the inner circumference of the cylinder 11. In this latter regard, the engaged surfaces of the ring 24 and cylinder 11 are finished to effectuate such a seal.

Opposite ends of the broken piston ring 24 are notched as illustrated in Figure 3 to provide oppositely offset circumferential projections 28 which in turn terminate in axially directed prongs or hook portions 29, the prong of each projection being adapted to abut the other projection in fluid sealing engagement as described below.

In the present instance, the opposite ends of the ring 24 are mirror images of each other and are dimensioned to provide a circumferential clearance between the end of each projection and the juxtaposed portion of the other end of the ring 24 amounting to approximately .002", although this clearance may feasibly range from .001" to .020", depending upon the pressure to which the seal is subjected. Preferably the axial dimension of each prong 29 from its integral projection 28 should be less than approximately .020" and the circumferential spacing between the prongs 29 when the ring 24 is in the assembled position of Figure 3, should preferably be less than approximately .040" in the ordinary power steering application. The latter spacing is provided to compensate for wear between the ring 24 and cylinder 11 and enables radial expansion of ring 24 in the event of such wear.

The foregoing dimensions are determined in order to prevent extrusion of the rubber-like material of the ring 25 into any of the various openings between the end portions of the ring 24 during operation at the highest pressure to which the seal should be subjected. Also in the above regard, the axial width of the ring 24 is preferably constant throughout, except at the aforesaid reduced extensions 28. In order to assure that the rubber-like ring 25 will not be extruded over the high pressure edge of the ring 24, the axial width of the ring 25 is preferably slightly less than the axial width of the ring 24. It is essential however that the ring 25 covers the junctures between the prongs 29 and projections 28.

A significant feature of the present construction is that the total axial width $w$ of either projection 28 and its integral prong 29 is greater than the width $n$ of the notch within which the prong and projection fit. Thus when the prongs 29 engage the confronting circumferential edges of the projections 28, the lateral circumferential extending edge of each projection 28 will be offset as indicated at 30 from the adjacent lateral edge at the other end of the ring 24. In consequence, when the piston is subjected to a fluid pressure differential, with the low pressure in chamber 14 as in Figures 1, 2, and 3, the rings 24 and 25 will be shifted to the right against the low pressure side of the groove 26. The right hand or low pressure edge of the right hand projection 28 will thus abut the side wall of the groove 26, whereas the corresponding edge of the ring 24 at its other end will be spaced from the side wall of the groove 26 by the amount of the clearance 30. By virtue of the pressure applied at the left edge of the ring 24, the prongs 29 are forced into sealing engagement with the confronting edges of the projections 28. The clearance 30 is determined in accordance with the magnitude of the dimensional tolerances permitted for the overall width of each integral prong and projection and assures the aforesaid sealing engagement between the prongs and projections while enabling relaxation of the dimensional tolerances. With a cast iron ring 24, the clearance 30 should be maintained at approximately .001" to .003" in order to minimize the possibility of breakage of the ring 24 during high pressure operation. With steel rings 24, the clearance 30 may be several thousandths of an inch, so that production of the end portions 28 and 29 is materially simplified.

When the pressure differential across the piston 12 is reversed, the rings 24 and 25 shift to the left as in Figure 4, but the sealing action is the same as above described. In each instance, the higher the pressure, the greater will be the force urging sealing engagement between the projections 28 and prongs 29 and accordingly the greater will be the sealing action.

For high pressure applications which tend to damage the projections 28, a modified structure is illustrated in Figure 5. The ring 24 is formed exactly as before, then one lateral edge is placed on a plane surface and the other edge is machined or ground under pressure to remove the material thereof down to the dotted line 30a of Figure 3, which line is substantially a coplanar continuation of the juxtaposed edge at the other end of the ring 24. The machining need not be completed to the dotted line 30a, but may leave a slight offset 30 of approximately a half-thousandth of an inch, depending on the operating pressure conditions. The ring is then reversed, the ground side is placed against the plane surface, and the opposite edge is similarly machined to the dotted line 30a. In consequence, the opposite edges of the ring 24 will extend on a bias with respect to the axial extension of the projections 28, but the entire edge of the ring 24 at the low pressure side will abut the corresponding edge of the groove 26 in load supporting relation to relieve the projections 28 from undue pressure. Both opposite edges of ring 24 of Figure 3 can be surface ground or machined simultaneously to achieve the structure of Figure 5, which operation can be facilitated by first confining the ring 24 within an outer concentric retainer ring and thereafter surface grinding opposite sides of both ring 24 and the retainer ring to the dimension desired, as for example by passing the assembly through a Blanchard grinder.

It is to be noted in regard to Figures 7 and 8 that the interengageable prongs or hook portions 29 facilitate assembly of the rings 24 and 25 with the piston 12 and maintain the same in the partially assembled position shown, until the piston 12 is mounted within the cylinder 11. Mounting of the piston assembly within the cylinder 11 is readily accomplished in accordance with conventional practice by use of a piston ring clamp. However the use of such a clamp can be avoided and movement of the piston with its sealing rings 24 and 25 into a predetermined portion of the cylinder 11 and across such projections as the projection 31, Figure 1, against which the end closure 32 seats, can be facilitated by chamfering the lateral edges of the ring 25 as indicated at 27.

Referring to Figures 9 and 10, a modification of the sealing structure is illustrated in association with inner and outer piston and cylinder members 35 and 36. Piston 35 is provided with a groove 37 comparable to the groove 26 and contains the rubber-like sealing ring 38 and piston ring 39, both of which are comparable to the rings 25 and 24 respectively. In this instance, the ring 38 in its undeformed condition comprises a conventional circular toroid or O-ring. However when the ring 38 is subjected to pressure, it is deformed resiliently somewhat as illustrated in Figure 10.

The piston ring 39 is formed with circumferentially extending lapping projections 40 arranged in side-by-side fluid sealing engagement substantially in the manner that the projections 28 are engaged by the prongs 29. As illustrated in Figure 9, the axial width of each projection 40 exceeds the corresponding width of the notch into which it extends so that a clearance 41 is provided between one end of the ring 39 and the adjacent low pressure wall of the groove 37 to assure a positive sealing engagement between the confronting surfaces of the projections 40 in the manner above described. Also as described in conjunction with Figures 1-9, the sealing structure of Figures 9 and 10 will be shifted to the low pressure side of the groove 37, so that the end projections 40 are preferably mirror images of each other.

Figures 11, 12, and 13 illustrate another embodiment of the present invention which adapts a pair of conventional piston rings 48 and 49 for use as a seal between inner and outer cylindrical members 45 and 46. The rings 48 and 49 are provided with the customary lapping ends and overlie a rubber-like ring 50 within a circumferential groove 47 formed in the outer periphery of the member 45. The ring 50 serves in the manner of the rings 25 and 38 so as to provide a fluid seal at the base of the groove 47 and at the inner circumferences of the rings 49 and 50, and also to urge the latter into sealing engagement with the inner periphery of the cylindrical member 46. When the pressure differential is applied across member 45, as for example from right to left in Figure 11, the rings 48, 49, and 50 are shifted to the left against the low pressure wall of the groove 47. In this action, the left edge of ring 49 in Figures 12 and 13 abuts the adjacent right hand edge of the ring 48 in sealing engagement, which engagement is urged by the aforesaid pressure differential. Accordingly, the greater the pressure differential across member 45, the greater will be the sealing action between rings 49 and 48. In such a construction, by reason of the absence of any structure comparable to the clearance 30 or 41, high pressure fluid entering the axial space 53 between the ends of ring 49 will also tend to move circumferentially along the juncture 52 to the axial space 54. At this point, the sealing action is effective and further fluid flow across the member 45 is blocked by ring 48. In this regard, it is preferred that the lapping portions of ring 48 be offset from the lapping portions of the ring 49. In the present instance, the junctures between the ends of rings 48 and 49 are offset 180° from each other.

Upon application of a pressure differential from left to right, a similar sealing action is effected. Fluid can pass along the axial space 55, thence circumferentially along the juncture 51, and thence axially along the space 56 to the ring 49, whereat further fluid passage is effectively blocked. In the embodiment illustrated in Figures 11, 12, and 13, chamfered edges comparable to the chamfer 27 must be avoided in order that the rings 48 and 49 will engage each other and the adjacent inner circumference of the member 46 in fluid sealing relationship.

In order to assure that the edges of the conventional split piston rings 48 and 49 at their opposite ends will lie flush with the corresponding side wall of the piston ring groove and effect a seal therewith when the piston rings 48 and 49 are not employed with an elastic rubber-like ring 50, it has been customary to provide clearances at 51 and 52 amounting to as much as a thousandth of an inch. Such clearances render the use of conventional rings impractical in hydraulic applications, except as disclosed in Figures 11-13, wherein dual split rings 48 and 49 having their individual junctures offset circumferentially from each other are employed in conjunction with elastic ring 50, as shown and described.

I claim:

1. In a fluid sealing device for a piston reciprocable within a cylinder, a circumferential groove formed in said piston, a pair of split piston rings arranged side-by-side at least partially within said groove, the juncture between the ends of each split piston ring being offset from the juncture between the ends of the other ring, and a ring of elastically deformable rubber-like material within said groove seated under compression against and in fluid sealing engagement with both the base of said groove and the inner circumference of said piston rings and urging the latter rings radially into sealing engagement with said cylinder, said rings being shiftable axially into abutment with the low pressure side of said groove when a fluid pressure differential is applied across said piston, and the piston ring at the high pressure side of said groove being urged into side-by-side fluid sealing engagement with the other piston ring by said pressure differential.

2. In a fluid sealing structure adapted for use between juxtaposed inner and outer members, a ring of elastically deformed rubber-like material seated against one of said members, and a broken ring of comparatively hard material seated under compression between said first ring and said other member, each of the opposite ends of said broken ring having a circumferentially extending notch offset from the corresponding notch in the other end and providing a circumferential projection of reduced axial width offset from the corresponding projection of the other end, the projection of each end extending into the notch of the other end in side-by-side relationship with the projection of the other end, means carried by at least one of said members for resisting axial displacement of said rings when a fluid pressure differential is applied thereacross, said extensions being urged together axially in fluid sealing engagement, said first ring engaging said broken ring and one member in fluid sealing relationship, and said broken ring engaging said other member in fluid sealing relationship.

3. In a fluid sealing structure adapted for use between juxtaposed inner and outer members, a ring of elastically deformed rubber-like material seated against one of said members, and a broken ring of comparatively hard material seated under compression between said first ring and said other member, each of the opposite ends of said broken ring having a circumferentially extending notch offset from the corresponding notch in the other end and providing a circumferential projection of reduced axial width offset from the corresponding projection of the other end, the projection of each end extending into the notch of the other end in side-by-side relationship with the projection of the other end, means carried by at least one of said members for resisting axial displacement of said rings when a fluid pressure differential is applied thereacross, said extensions being urged together axially in fluid sealing engagement, said first ring engaging said broken ring and one member in fluid sealing relationship, and said broken ring engaging said other member in fluid sealing relationship, the axial width of the notch proximate the low pressure side of said broken ring being less than the axial width of the projection extending into the latter notch.

4. In a fluid sealing structure adapted for use between juxtaposed inner and outer members, a ring of elastically deformed rubber-like material seated against one of said members, and a broken ring of comparatively hard material seated under compression between said first ring and said other member, each of the opposite ends of said broken ring having a generally circumferentially extending notch offset from the corresponding notch in the other end and providing a generally circumferential projection of reduced axial width offset from the corresponding projection of the other end, the projection of each end extending into the notch of the other end in side-by-side relationship with the projection of the other end, means carried by at least one of said members for resisting axial displacement of said rings when a fluid pressure differential is applied thereacross, said extensions being urged together axially in fluid sealing engagement, said first ring engaging said broken ring and one member in fluid sealing relationship, and said broken ring engaging said other member in fluid sealing relationship, the edge of said broken ring at the low pressure side thereof being formed on a bias with respect to said notches and projections and lying in a plane normal to the axis of said rings.

5. In a fluid sealing structure adapted for use between juxtaposed inner and outer members, a ring of elastically deformable rubber-like material seated against one of said members, and a broken ring of comparatively hard material seated under compression between said first ring and said other member, each of the opposite ends of said broken ring having a circumferentially extending notch offset from the corresponding notch in the other end and providing a circumferential projection of reduced axial width offset from the corresponding projection of the other end, the projection of each end extending into the notch of the other end and terminating in an inturned hook portion interengageable with the hook portion of the other projection to prevent separation of said ends prior to assembly of said sealing structure with both said members, the hook portion of at least one projection abutting the other projection in fluid sealing engagement.

6. In a fluid sealing structure adapted for use between juxtaposed inner and outer members, a ring of elastically deformable rubber-like material seated against one of said members, and a broken ring of comparatively hard material seated under compression between said first ring and said other member, each of the opposite ends of said broken ring having a circumferentially extending notch offset from the corresponding notch in the other end and providing a circumferential projection of reduced axial width offset from the corresponding projection of the other end, the projection of each end extending into the notch of the other end and terminating in an inturned hook portion interengageable with the hook portion of the other projection to prevent separation of said ends prior to assembly of said sealing structure with both said members, the hook portion of at least one projection abutting the other projection in fluid sealing engagement, the axial width of the notch proximate the low pressure side of said broken ring being less than the total axial width of the projection and hook portion extending into the latter notch.

7. In a fluid sealing structure adapted for use between juxtaposed inner and outer members, a ring of elastically deformable rubber-like material seated against one of said members, and a broken ring of comparatively hard material seated under compression between said first ring and said other member, each of the opposite ends of said broken ring having a generally circumferentially extending notch offset from the corresponding notch in the other end and providing a generally circumferential projection of reduced axial width offset from the corresponding projection of the other end, the projection of each end extending into the notch of the other end and terminating in an inturned hook portion interengageable with the hook portion of the other projection to prevent separation of said ends prior to assembly of said sealing structure with both said members, the hook portion of at least one projection abutting the other projection in fluid sealing engagement, the edge of said broken ring at the low pressure side being formed on a bias with respect to said notches and projections and lying in a plane normal to the axis of said rings.

8. In a fluid sealing structure adapted for use between inner and outer cylindrical members having a groove formed therebetween, a ring of elastically deformable rubber-like material and a broken ring of comparatively hard material within said groove, the first ring of rubber-like material being seated under compression against one of said members at the base of said groove in fluid sealing engagement with said base, said broken ring being seated under compression between said first ring and said other member in fluid sealing engagement with both said first ring and other member, each of the opposite ends of said broken ring having a circumferentially extending notch offset from the corresponding notch in the other end and providing a circumferential projection of reduced axial width offset from the corresponding projection of the other end, the projection of each end extending into the notch of the other end in side-by-side fluid sealing relationship and being urged together when a pressure differential is applied axially across said rings, the axial width of the notch proximate the low pressure side of said broken ring being less than the axial width of the projection extending into the latter notch.

9. In a fluid sealing structure adapted for use between inner and outer cylindrical members having a groove formed therebetween, a ring of elastically deformable rubber-like material and a broken ring of comparatively hard material within said groove, the first ring of rubber-like material being seated under compression against one of said members at the base of said groove in fluid sealing engagement with said base, said broken ring being seated under compression between said first ring and said other member in fluid sealing engagement with both said first ring and other member, each of the opposite ends of said broken ring having a circumferentially extending notch offset from the corresponding notch in the other end and providing a circumferential projection of reduced axial width offset from the corresponding projection of the other end, the projection of each end extending into the notch of the other end and terminating in a hook portion directed axially toward the projection of the other end, the hook portion of at least one projection engaging the other projection in fluid sealing relationship, said hook portions being interengageable to prevent separation of said ends prior to assembly of said sealing structure with both said members, and the axial dimension of the notch proximate the low pressure side of said broken ring being less than the combined axial dimension of the projection and hook portion extending into the latter notch.

10. In a fluid sealing structure for a piston reciprocable in a cylinder and having an outer circumferential groove, a ring of elastically deformable rubber-like material within said groove and seated against a base thereof in fluid sealing relation, a split piston ring at least partially within said groove and seated under compression against the first ring and the inner wall of said cylinder in fluid sealing engagement with both said first ring and wall, each of the opposite ends of said split ring having a circumferentially extending notch offset from the corresponding notch in the other end and providing a circumferential projection of reduced axial width extending into the notch of the other end in side-by-side fluid sealing relationship with the projection of the other end, the axial width of each notch being less than the axial width of the projection extending thereinto, said rings being urged to the low pressure side of said groove and said projections being urged together into said sealing relationship by the fluid pressure differential across said piston.

11. In a fluid sealing structure for a piston reciprocable in a cylinder and having an outer circumferential groove, a ring of elastically deformable rubber-like material within said groove and seated against a base thereof in fluid sealing relation, a split piston ring at least partially within said groove and seated under compression against the first ring and the inner wall of said cylinder in fluid sealing engagement with both said first ring and wall, each of the opposite ends of said split ring having a circumferentially extending notch offset from the corresponding notch in the other end and providing a circumferential projection of reduced axial width extending into the notch of the other end, each projection terminating in a hook portion directed axially toward the other projection and the hook portion of at least one projection engaging the other projection in fluid sealing relationship, said hook portions being interengageable to prevent separation of said ends prior to assembly of said sealing structure with said cylinder and piston, and the axial width of each notch being less than the combined axial width of the projection and hook portion extending into the latter notch, said rings being urged against the low pressure side of said groove and said hook portions being urged toward the adjacent projection by the pressure differential across said piston.

12. In a fluid sealing structure adapted for use between juxtaposed inner and outer members, a broken ring seated against one of said members, sealing ring means interposed between the broken ring and the other of said members and being seated under compression against said broken ring to urge the latter against said one member, each of the opposite ends of said broken ring having a circumferentially extending notch offset from the corresponding notch in the other end and providing a circumferential projection of reduced axial width offset from the corresponding projection of the other end, the projection of each end extending into the notch of the other end and terminating in an inturned hook portion interengageable with the hook portion of the other projection to prevent separation of said ends prior to assembly of said sealing structure with both said members, the hook portion of at least one projection abutting the other projection in fluid sealing engagement.

13. In a fluid sealing structure adapted for use between juxtaposed inner and outer members, a ring of elastically deformable material seated against one of said members, a pair of split piston rings arranged side-by-side under compression between said deformable ring and the other of said members, the juncture between the ends of each split piston ring being offset from the juncture between the ends of the other split ring, said deformable ring engaging said one member and the inner circumference of said pair of piston rings to urge the latter into sealing engagement with said other member, means carried by at least one of said members for resisting axial displacement of said rings when a fluid pressure differential is applied thereacross, said piston rings being urged into side-by-side fluid sealing engagement with each other by said pressure differential.

References Cited in the file of this patent
UNITED STATES PATENTS 2,876,052   Burt _____ Mar. 3, 1959